(12) United States Patent
Mitsubori et al.

(10) Patent No.: US 10,047,805 B2
(45) Date of Patent: Aug. 14, 2018

(54) CLUTCH HYDRAULIC PRESSURE CONTROL CIRCUIT

(71) Applicant: HONDA MOTOR CO., LTD., Tokyo (JP)

(72) Inventors: Toshimasa Mitsubori, Wako (JP); Dai Arai, Wako (JP); Yasushi Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 15/212,472

(22) Filed: Jul. 18, 2016

(65) Prior Publication Data

US 2017/0030419 A1    Feb. 2, 2017

(30) Foreign Application Priority Data

Jul. 31, 2015  (JP) .................................. 2015-152104

(51) Int. Cl.
*F16D 21/06* (2006.01)
*F16H 3/00* (2006.01)
*F16H 37/04* (2006.01)

(52) U.S. Cl.
CPC ...... *F16D 21/06* (2013.01); *F16D 2021/0623* (2013.01); *F16D 2021/0661* (2013.01); *F16D 2021/0692* (2013.01); *F16D 2500/1027* (2013.01); *F16D 2500/3024* (2013.01); *F16D 2500/501* (2013.01); *F16H 3/006* (2013.01); *F16H 2037/045* (2013.01); *F16H 2037/049* (2013.01); *F16H 2200/0078* (2013.01)

(58) Field of Classification Search
CPC .. F16D 21/06; F16D 21/00; F16D 2021/0653; F16D 2500/1027; F16D 2500/3024; F16D 2021/0692; F16D 2021/0661; F16H 3/66; F16H 2037/045; F16H 2037/049
See application file for complete search history.

(56) References Cited

U.S. PATENT DOCUMENTS

| 5,203,862 A * | 4/1993 | Nishida ................... F16H 3/666 475/282 |
| 8,229,637 B2 * | 7/2012 | Kobayashi .............. F16H 59/72 701/51 |
| 9,193,258 B2 * | 11/2015 | Hoshinoya ............. B60K 11/02 |

(Continued)

FOREIGN PATENT DOCUMENTS

JP    2010-078118    4/2010

*Primary Examiner* — Stacey A Fluhart
(74) *Attorney, Agent, or Firm* — Rankin, Hill & Clark LLP

(57) ABSTRACT

A clutch hydraulic pressure control circuit includes: a shift valve for switching the destination to feed hydraulic pressure to a first hydraulic clutch or a second hydraulic clutch; and first and second shift solenoid valves operating synchronously to actuate the shift valve. The two shift solenoid valves include a holding valve for keeping hydraulic pressure fed to the shift valve even when hydraulic pressure supply through one of the first and second shift solenoid valves happens to be shut off while hydraulic pressure is fed through the first and second shift solenoid valves to paths between the shift valve and the shift solenoid valves, or when hydraulic pressure supply through one of the first and second shift solenoid valves happens to occur while no hydraulic pressure is fed through the shift solenoid valves.

11 Claims, 13 Drawing Sheets

(56) References Cited

U.S. PATENT DOCUMENTS

| | | | |
|---|---|---|---|
| 2011/0155533 A1* | 6/2011 | Muller | F16D 48/0206 192/85.63 |
| 2014/0097043 A1* | 4/2014 | Hoshinoya | F16H 57/0405 184/6.4 |
| 2014/0291106 A1* | 10/2014 | Mitsubori | F16D 25/06 192/85.63 |
| 2015/0080177 A1* | 3/2015 | Sakamoto | F16H 61/061 477/79 |

* cited by examiner

CLUTCH HYDRAULIC PRESSURE CONTROL CIRCUIT

BACKGROUND OF THE INVENTION

Field of the Invention

The present invention relates to a clutch hydraulic pressure control circuit, and particularly relates to a clutch hydraulic pressure control circuit used in a transmission equipped with a twin clutch whose engagement and disengagement is controlled by hydraulic pressure supply.

Description of Related Art

Heretofore, a twin-clutch transmission has been known which is provided with two clutches (a first hydraulic clutch and a second hydraulic clutch) between a crankshaft and a main shaft of the transmission and capable of sequential gear change without interrupting transmission of drive force from an engine by controlling the alternate engagement/disengagement of the first hydraulic clutch and the second hydraulic clutch in tandem with a turn operation of a shift drum by an electric motor.

Japanese Patent Application Publication No. 2010-78118 discloses a twin-clutch transmission which includes a single linear solenoid valve configured to control hydraulic pressure fed from a hydraulic pressure source and controls engagement/disengagement of a first hydraulic clutch and a second hydraulic clutch by driving, with a shift solenoid valve, a shift valve configured to switch the destination to feed hydraulic pressure through the linear solenoid valve between these two clutches.

Meanwhile, in the twin-clutch transmission as described above, speedy gear change to the next gear only with clutch switching control is possible by keeping both the dogs of an odd-numbered gear corresponding to the first hydraulic clutch and the dogs of an even-numbered gear corresponding to the second hydraulic clutch meshed in place. However, if the dogs of the third gear are kept meshed during driving in the second gear, for example, a clutch plate of the first hydraulic clutch corresponding to odd-numbered gears is co-rotated and friction thus occurs.

Hence, in order to suppress friction due to this co-rotation, there is known a configuration in which, during driving, both the dogs of an odd-numbered gear and the dogs of an even-numbered gear are meshed for only a small time period at the time of gear change, and except this period only the dogs of one of the gears are meshed and the dogs of the other are set in neutral mode, i.e., set in neutral standby position.

However, in the technique of Japanese Patent Application Publication No. 2010-781181, a function to select a clutch to be connected is given to the single shift solenoid valve only. Thus, if the shift solenoid valve fails during driving with one of an odd-numbered gear and an even-numbered gear set in neutral standby position, hydraulic pressure to be fed to a connected clutch might vary and drive force might vary accordingly.

SUMMARY OF THE INVENTION

The present invention is directed toward solving the problem of the existing technique described above and providing a clutch hydraulic pressure control circuit with which drive force no longer varies even when a shift solenoid valve configured to drive a shift valve fails during driving.

In accordance with a first aspect of the present invention, a clutch hydraulic pressure control circuit of a twin-clutch transmission having a twin clutch is composed of: a first hydraulic clutch corresponding to an odd-numbered gear of the transmission; and a second hydraulic clutch corresponding to an even-numbered gear of the transmission, and employing a shift pattern where one of the odd-numbered gear and the even-numbered gear is set in neutral mode when the other of the odd-numbered gear and the even-numbered gear is in drive force transmission mode. The circuit includes a shift valve that is configured to switch the destination to feed hydraulic pressure to either the first hydraulic clutch or the second hydraulic clutch; two shift solenoid valves that operate synchronously to actuate the shift valve; and a holding valve that is configured to keep hydraulic pressure fed to the shift valve even when hydraulic pressure supply through one of the two shift solenoid valves happens to be shut off in a state where hydraulic pressure is fed through the two shift solenoid valves to a path between the shift valve and the shift solenoid valves, or when hydraulic pressure supply through one of the two shift solenoid valves is in a state where no hydraulic pressure is fed through the shift solenoid valves.

According to the first aspect, the clutch hydraulic pressure control circuit includes: the shift valve that is configured to switch the destination to feed hydraulic pressure to either the first hydraulic clutch or the second hydraulic clutch; the two shift solenoid valves that operate synchronously to actuate the shift valve; and the holding valve that is configured to keep hydraulic pressure fed to the shift valve even when hydraulic pressure supply through one of the two shift solenoid valves is shut off in a state where hydraulic pressure is fed through the two shift solenoid valves to the path between the shift valve and the shift solenoid valves, or when hydraulic pressure supply through one of the two shift solenoid valves occurs in a state where no hydraulic pressure is fed through the shift solenoid valves. Thus, by driving the two shift solenoid valves synchronously, even when one of the shift solenoid valves fails with the first hydraulic clutch or the second hydraulic clutch being connected, the first hydraulic clutch or the second hydraulic clutch can be kept connected. Accordingly, a twin-clutch transmission employing a shift pattern of "neutral standby positions" can enjoy only the friction reduction effect brought by the "neutral standby positions" while drive force no longer varies even when one of the shift solenoid valves fails during driving.

Further, according to a second aspect of the present invention the holding valve has: a first pressure sensing section and a second pressure sensing section to which hydraulic pressure fed through the two shift solenoid valves is fed; a spool valve that includes a return spring opposed to the first pressure sensing section and second pressure sensing section; and a third pressure sensing section that is provided in the holding valve so that hydraulic reaction force of supply hydraulic pressure to be fed through the holding valve to the shift valve is applied to the biasing force of the return spring.

According to the second aspect, the holding valve has: the first pressure sensing section and the second pressure sensing section to which hydraulic pressure fed through the two shift solenoid valves is fed; the spool valve that includes the return spring opposed to the first pressure sensing section and second pressure sensing section; and the third pressure sensing section that is provided in the holding valve so that hydraulic reaction force of supply hydraulic pressure to be fed through the holding valve to the shift valve is applied to the biasing force of the return spring. Thus, the oil path between the two shift solenoid valves and the shift valve is switched by a combination of the three pressure sensing sections and the return spring provided in the holding valve, whereby the clutch hydraulic pressure control circuit with which drive force no longer varies even when the shift solenoid valve fails can be formed only by such a mechanical structure.

Further, in accordance with a third aspect of the present invention the two shift solenoid valves are formed of the same component, and the two shift solenoid valves perform control to open/close a branch path that branches from an oil feed path connected to an oil pump.

According to the third aspect, the two shift solenoid valves are formed of the same component, and the two shift solenoid valves perform control to open/close the branch path that branches from the oil feed path connected to the oil pump. Thus, the structure is simplified by using the same component for these shift solenoid valves, and the clutch hydraulic pressure control circuit can be formed with a simple structure by performing open/close control at the branch path.

Further, according to a fourth aspect of the present invention the shift solenoid valves are normally-open valves that are open while not energized and closed while energized, and the third pressure sensing section is located downstream of a branch path designed to be opened and closed by the holding valve.

According to the fourth aspect, the shift solenoid valves are normally-open valves that are open while not energized and closed while energized, and the third pressure sensing section is located downstream of the branch path designed to be opened and closed by the holding valve. Thus, when the shift solenoid valves are in closed mode, since hydraulic pressure fed from the oil pump acts on the third pressure sensing section and is added to the biasing force of the return spring, the holding valve can be prevented from being moved even when hydraulic pressure happens to act on one of the first and second pressure sensing sections due to failure of one of the shift solenoid valves. Thereby, the clutch connection status before the failure can be kept in spite of the failure of the shift solenoid valve, whereby a variation of drive force can be prevented.

Further, according to a fifth aspect of the present invention a linear solenoid valve configured to control hydraulic pressure to be fed to the first hydraulic clutch and the second hydraulic clutch is made as a normally-open valve, which is open while not energized and closed while energized.

According to the fifth aspect, the linear solenoid valve configured to control hydraulic pressure to be fed to the first hydraulic clutch and the second hydraulic clutch is made as a normally-open valve that is open while not energized and closed while energized. Thus, even when the linear solenoid valve fails or power supply to the linear solenoid valve is shut off, the connection status of the first hydraulic clutch or the second hydraulic clutch can be prevented from being changed.

Further, according to a sixth aspect of the present invention the shift solenoid valves are normally-closed valves that are closed while not energized and open while energized, and the third pressure sensing section is located downstream of a branch path designed to be opened and closed by the holding valve.

According to the sixth aspect, the shift solenoid valves are normally-closed valves that are closed while not energized and open while energized, and the third pressure sensing section is located downstream of the branch path designed to be opened and closed by the holding valve. Thus, when the shift solenoid valves are in closed mode, since hydraulic pressure fed from the oil pump acts on the third pressure sensing section and is added to the biasing force of the return spring, the holding valve can be prevented from being moved even when hydraulic pressure happens to act on one of the first and second pressure sensing sections due to failure of one of the shift solenoid valves. Thereby, the clutch connection status before the failure can be kept in spite of the failure of the shift solenoid valve, whereby a variation of drive force can be prevented.

BRIEF DESCRIPTION OF THE DRAWINGS

These and further features of the invention will be apparent with reference to the following description and drawings, wherein.

DETAILED DESCRIPTION OF THE INVENTION

Figure 1:
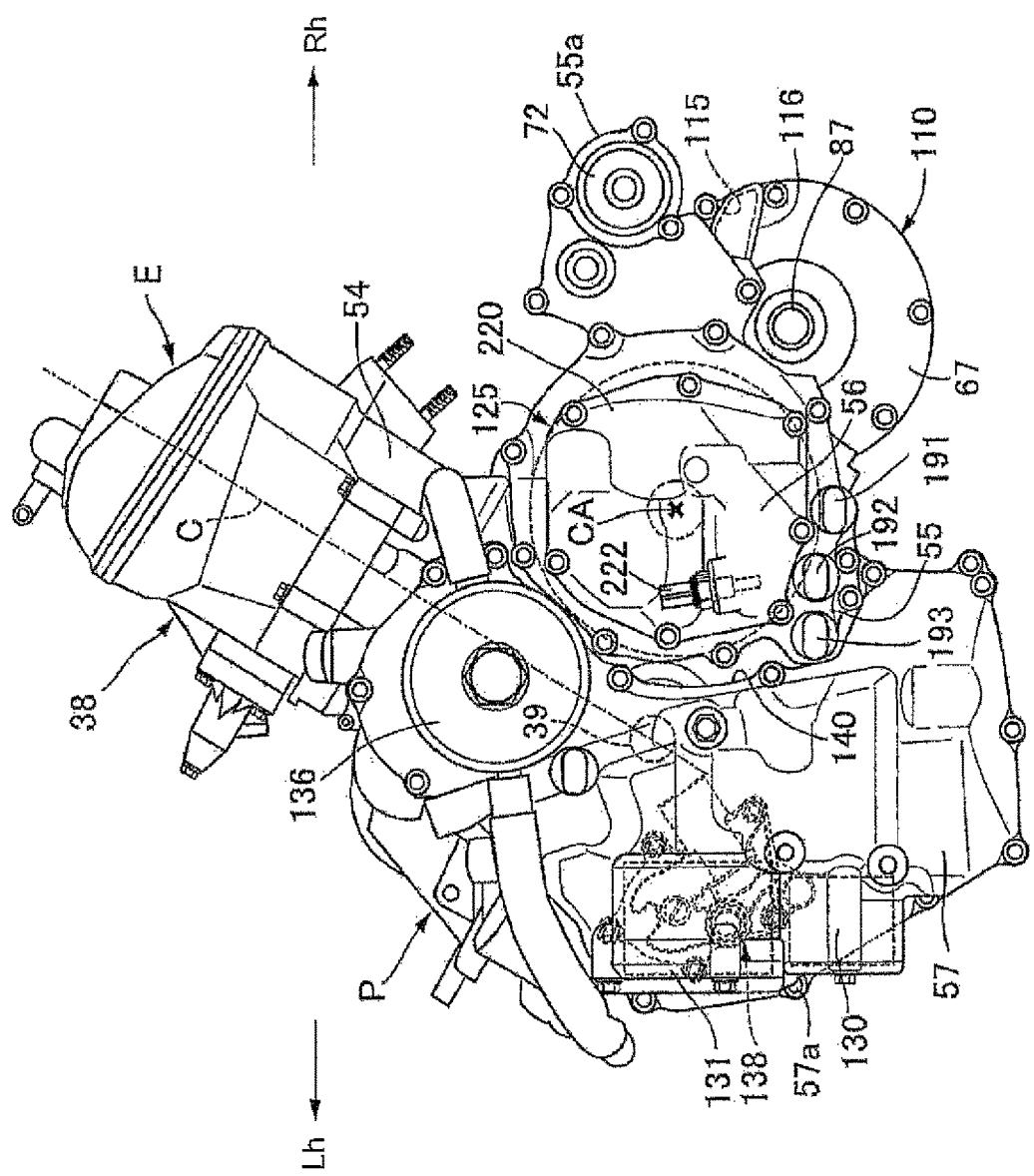
FIG. 1 is a side view of a power unit employing a clutch hydraulic pressure control circuit according to an embodiment of the present invention.
Figure 2:
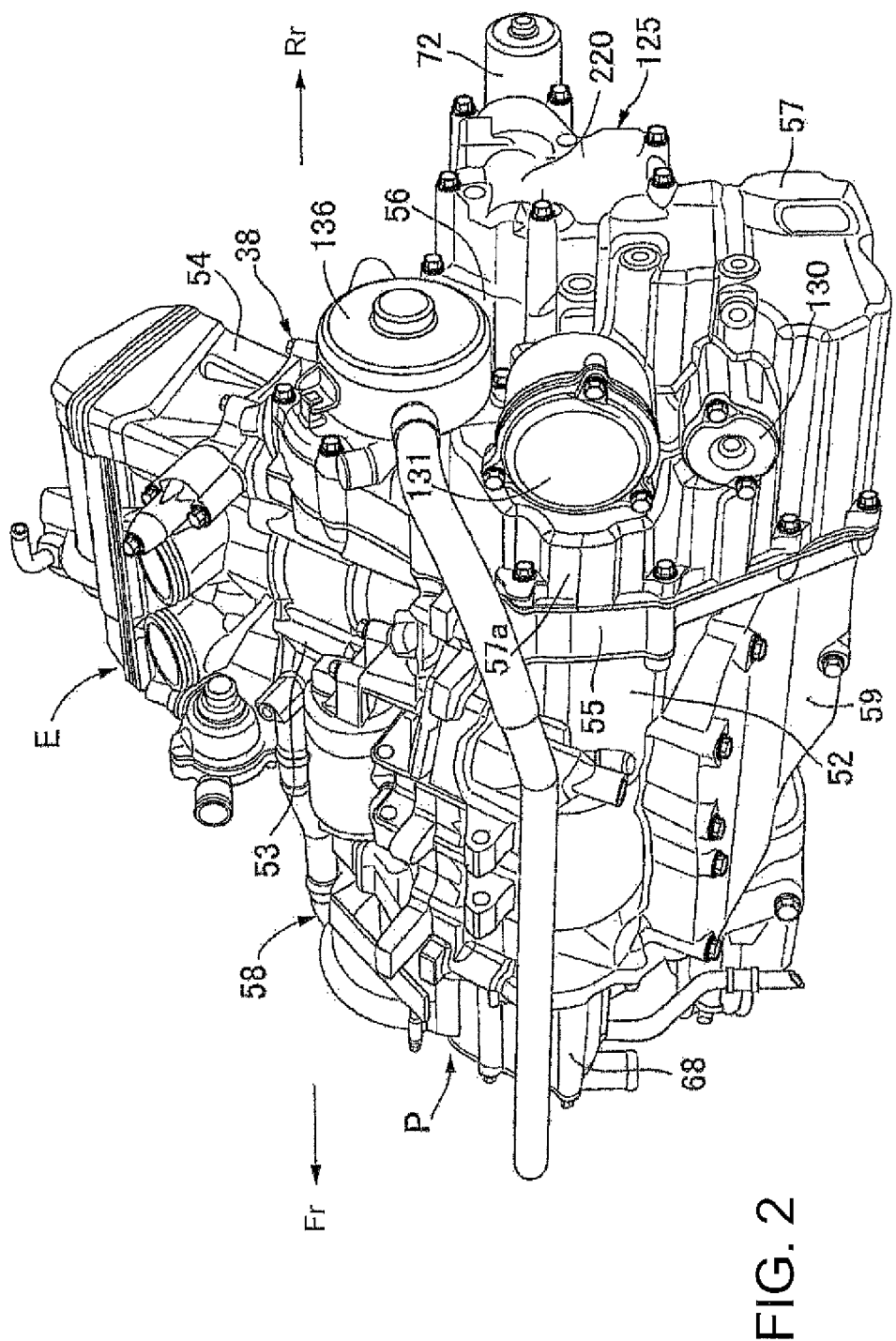
FIG. 2 is a perspective view of the power unit.

Hereinbelow, a preferred embodiment of the present invention is described in detail with reference to the drawings. FIG. 1 is a side view of a power unit P employing a clutch hydraulic pressure control circuit according to this embodiment. In addition, FIG. 2 is a perspective view of the power unit P. The power unit P is a vehicle power source made by integrally combining an internal combustion engine E with a power transmission device including a twin-clutch transmission, and is applicable to various vehicles such as motorcycles, three-wheeled vehicles, and four-wheeled vehicles.

The internal combustion engine E is a parallel two cylinder four cycle engine, and an intake device and an exhaust device (not illustrated) are mounted on a cylinder head 54 of an engine body 38. The engine body 38 has: a crankcase 52 which rotatably supports a crankshaft 39 extending in the longitudinal direction of a vehicle; a cylinder block 53 which has a tilting cylinder axis C and is coupled to the crankcase 52; and the cylinder head 54 which is coupled to an upper part of the cylinder block 53.

A spacer plate 55 constituting a part of the engine body 38 is coupled to a back surface of the crankcase 52, and a clutch cover 56 and an oil reservoir tank 57 are coupled to the crankcase 52 via the spacer plate 55 so as to protrude rearward from the crankcase 52. A subtransmission case 58 is coupled to a side of the crankcase opposite the oil reservoir tank 57 in the direction of an axis CA of the crankshaft 39, i.e., to a front surface side of the crankcase 52, and an oil pan 59 is coupled to a lower part of the crankcase 52.

Figure 3:
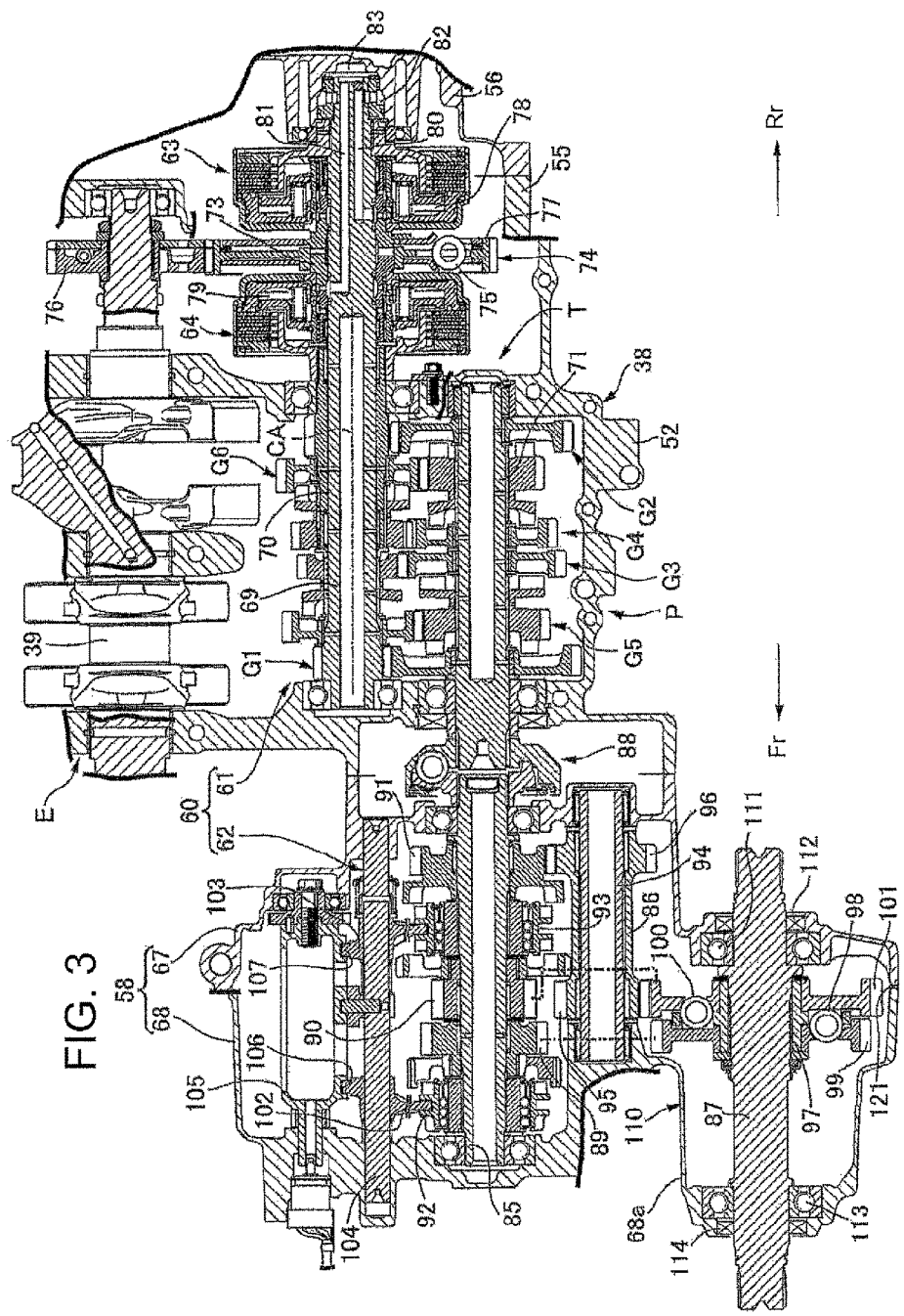
FIG. 3 is a development sectional view of a power transmission system of the power unit.

FIG. 3 is a development sectional view of a power transmission system of the power unit P. A power transmission device T constituting the power unit P together with the internal combustion engine E is provided in a drive train from the crankshaft 39 of the internal combustion engine E to a drive wheel of the vehicle. The power transmission device T includes a transmission 60, a first hydraulic clutch 63, and a second hydraulic clutch 64. The first hydraulic clutch 63 and the second hydraulic clutch 64 are mounted between the transmission 60 and the crankshaft 39.

The transmission 60 is constituted of: a main transmission 61, which is housed in the crankcase 52; and a subtransmission 62, which is housed in the subtransmission case 58. The subtransmission case 58 is composed of: a first case member 67, which is coupled to a front surface of the crankcase 52; and a second case member 68, which interposes the first case member 67 between itself and the crankcase 52.

The main transmission 61 includes: a first main shaft 69 and a second main shaft 70, which are input shafts from the crankshaft 39 to the transmission 60; a countershaft 71; first, third, and fifth speed gear trains G1, G3, and G5, which are arranged between the first main shaft 69 and the countershaft 71 so that they can be established selectively; and second, fourth, and sixth speed gear trains G2, G4, and G6, which are arranged between the second main shaft 70 and the countershaft 71 so that they can be established selectively.

The first and second main shafts 69 and 70 are supported by the crankcase 52 so as to be rotatable relative to each other and in such a way that the second main shaft 70 coaxially surrounds a part of the first main shaft 69, have an axis parallel with the crankshaft 39, and are arranged at the right side of the crankshaft 39. The countershaft 71 has an axis parallel with the first and second main shafts 69 and 70 and is rotatably supported by the crankcase 52.

The establishment of the gear train is selectively switched among the first to sixth speed gear trains G1 to G6 by the actuation of a gear-change electric motor 72. The gear-change electric motor 72 is mounted on a side protruding portion 55a provided in the spacer plate 55 so as to protrude rightward from the clutch cover 56.

A transmission tubular shaft 73 which coaxially surrounds the first main shaft 69 is supported in a part behind the first main shaft 69 in its axial direction so as to be immovable axially and rotatable relative to the first main shaft. The first hydraulic clutch 63 is provided on the first main shaft 69 and the transmission tubular shaft 73 so as to be capable of switching connection/disconnection of power transmission between the transmission tubular shaft 73 and the first main shaft 69. The second hydraulic clutch 64 is provided on the transmission tubular shaft 73 and the second main shaft 70 so as to be capable of switching connection/disconnection of power transmission between the transmission tubular shaft 73 and the second main shaft 70.

Rotational power from the crankshaft 39 is transmitted to the transmission tubular shaft 73 via a primary speed reducer 74 and a damper spring 75. The primary speed reducer 74 is composed of: a primary drive gear 76, which is designed to rotate with the crankshaft 39; and a primary driven gear 77, which meshes with the primary drive gear 76 and is coaxially disposed with the first and second main shafts 69 and 70. The primary driven gear 77 is coupled to the transmission tubular shaft 73 via the damper spring 75.

The first hydraulic clutch 63 has a first hydraulic chamber 78 and is disposed outside the primary speed reducer 74 in the axial direction. While no hydraulic pressure acts on the first hydraulic chamber 78, the first hydraulic clutch 63 is in clutch off mode where power transmission is shut off. On the other hand, when hydraulic pressure acts on the first hydraulic chamber 78, the first hydraulic clutch turns to clutch on mode where rotational power transmitted from the crankshaft 39 via the primary speed reducer 74, the damper spring 75, and the transmission tubular shaft 73 is transmitted to the first main shaft 69.

The second hydraulic clutch 64 has a second hydraulic chamber 79 and is disposed inside the first hydraulic clutch 63 in the axial direction so as to sandwich the primary speed reducer 74 between itself and the first hydraulic clutch 63. While no hydraulic pressure acts on the second hydraulic chamber 79, the second hydraulic clutch 64 is in clutch off mode where power transmission is shut off. On the other hand, when hydraulic pressure acts on the second hydraulic chamber 79, the second hydraulic clutch turns to clutch on mode where rotational power transmitted from the crankshaft 39 via the primary speed reducer 74, the damper spring 75, and the transmission tubular shaft 73 is transmitted to the second main shaft 70.

In the first main shaft 69, first and second axial oil paths 80 and 81 parallel with each other are provided to have closed inner ends and extend axially. The first axial oil path 80 communicates with the first hydraulic chamber 78, whereas the second axial oil path 81 communicates with the second hydraulic chamber 79. In the clutch cover 56, a first oil path 82 communicating with the first axial oil path 80 and a second oil path 83 communicating with the second axial oil path 81 are formed.

The subtransmission 62 includes: a transmission drive shaft 85; an idle shaft 86; and a drive force output shaft 87. The transmission drive shaft 85 extends in the longitudinal direction coaxially with the countershaft 71 of the main transmission 61 and is rotatably supported by the first and second case members 67 and 68 of the subtransmission case 58. A rear end part of the transmission drive shaft 85 rotatably penetrates the first case member 67 and protrudes toward the crankcase 52, and a front end part of the countershaft 71 rotatably penetrating the crankcase 52 is coaxially coupled to the rear end part of the transmission drive shaft 85 via a damper mechanism 88. Thereby, rotational power from the countershaft 71 is transmitted to the transmission drive shaft 85 via the damper mechanism 88.

A high-speed drive gear 89, a low-speed drive gear 90, and a reverse drive gear 91 are arranged on the transmission drive shaft 85 in this order from the front and supported by this shaft so as to be rotatable relative to the shaft. In an area between the second case member 68 and the high-speed drive gear 89, a high-speed switchover shifter 92 incapable of rotation relative to the transmission drive shaft 85 is supported on the transmission drive shaft 85 so as to be slidable on this shaft to switch its position between: a position at which this shifter engages with the high-speed drive gear 89; and a neutral position at which this shifter disengages from the high-speed drive gear 89. In an area between the low-speed drive gear 90 and the reverse drive gear 91, a forward/backward movement switchover shifter 93 incapable of rotation relative to the transmission drive shaft 85 is supported on the transmission drive shaft 85 so as to be slidable on this shaft to switch its position among: a position at which this shifter engages with the low-speed drive gear 90; a position at which this shifter engages with the reverse drive gear 91; and a neutral position at which this shifter engages with neither the low-speed drive gear 90 nor the reverse drive gear 91.

The idle shaft 86 is formed in the shape of a cylinder surrounding a support shaft 94, which is rotatably supported by the first and second case members 67 and 68 of the subtransmission case 58, and is supported on the support shaft 94 so as to be rotatable relative to this shaft. Inside the subtransmission case 58, a small-diameter idle gear 95 and a large-diameter idle gear 96 are integrally arranged on front and rear parts of the idle shaft 86, and the large-diameter idle gear 96 meshes with the reverse drive gear 91.

A first shift fork 102 rotatably embracing the high-speed switchover shifter 92 and a second shift fork 103 rotatably embracing the forward/backward movement switchover shifter 93 are slidably supported on a shift fork shaft 104, which has an axis parallel with the transmission drive shaft 85 and is supported by the first and second case members 67 and 68 of the subtransmission case 58. A sub shift drum 105 having an axis parallel with the shift fork shaft 104 is turnably supported by the first and second case members 67 and 68, and the first and second shift forks 102 and 103 respectively engage with guide grooves 106 and 107 provided in the outer circumference of the sub shift drum 105.

The first and second shift forks 102 and 103 move along the shift fork shaft 104 with the turning of the sub shift drum 105, whereby the high-speed drive gear 89, the low-speed drive gear 90, and the reverse drive gear 91 are selectively coupled to the transmission drive shaft 85 so as to be unrotatable relative to this shaft.

An output shaft supporting portion 110 protruding rightward of the crankcase 52 is formed in the subtransmission case 58. The drive force output shaft 87 being axially offset with respect to the first and second main shafts 69 and 70 is rotatably supported by the output shaft supporting portion 110. A rear part of the drive force output shaft 87 rotatably penetrates the output shaft supporting portion 110 on the first case member 67 side and protrudes rearward therefrom while a ball bearing 111 and an oil seal 112 disposed outside the ball bearing 111 are interposed between itself and the output shaft supporting portion 110. A front part of the drive force output shaft 87 rotatably penetrates the output shaft supporting portion 110 on the second case member 68 side and protrudes forward therefrom while a ball bearing 113 and an oil seal 114 disposed outside the ball bearing 113 are interposed between itself and the output shaft supporting portion 110.

A breather chamber 115 is formed in an area between the first case member 67 and the second case member 68 so that it is at least partially disposed above a part of a rear end part of the drive force output shaft 87 protruding from the output shaft supporting portion 110. A bulge portion 116 bulging rearward is provided integrally on the first case member 67 at a part corresponding to an upper part of the output shaft supporting portion 110, and the breather chamber 115 is formed between the bulge portion 116 and an upper part of the second case member 68 at a position corresponding to the output shaft supporting portion 110. The second case member 68 of the subtransmission case 58 integrally has a tubular portion 68a, which extends forward in the direction of the axis of the drive force output shaft 87 so as to laterally cover the drive force output shaft 87.

Figure 4:
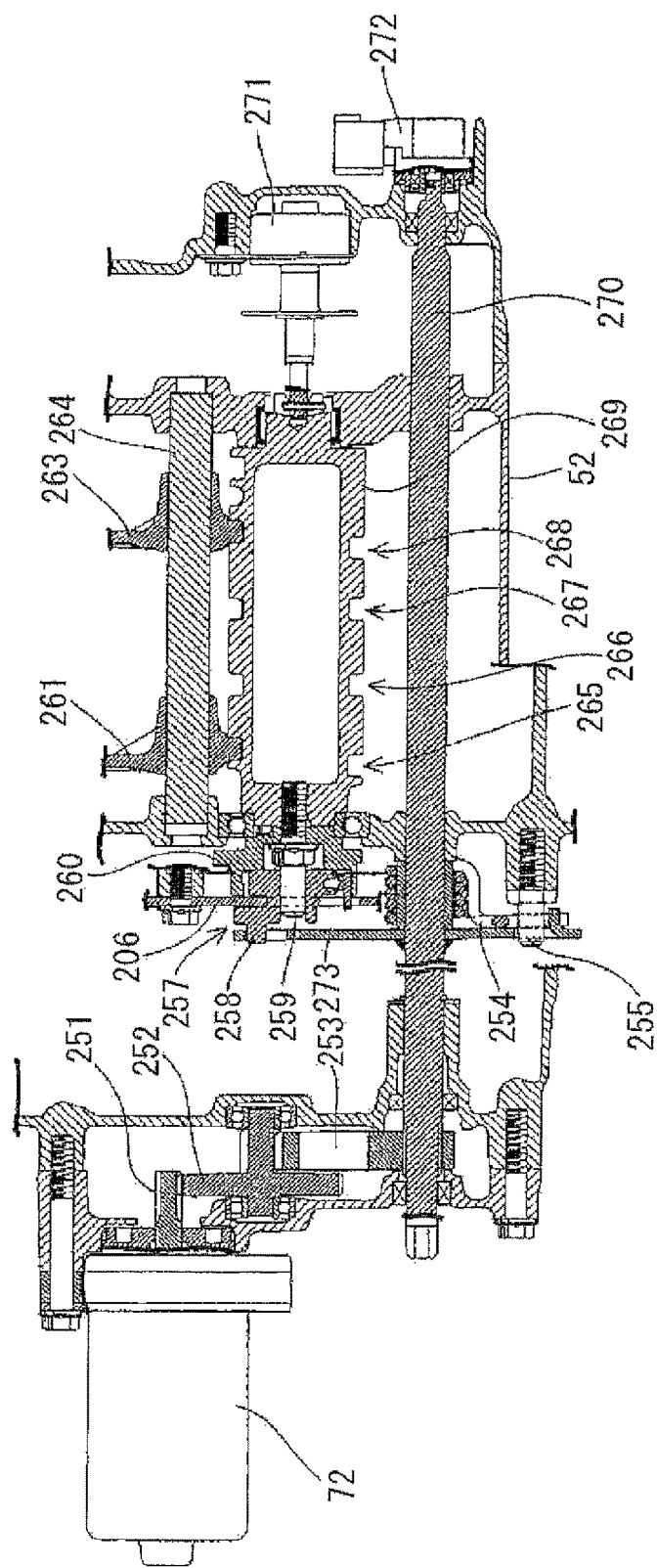
FIG. 4 is a sectional view of a gear-change mechanism of a main transmission.
Figure 5:
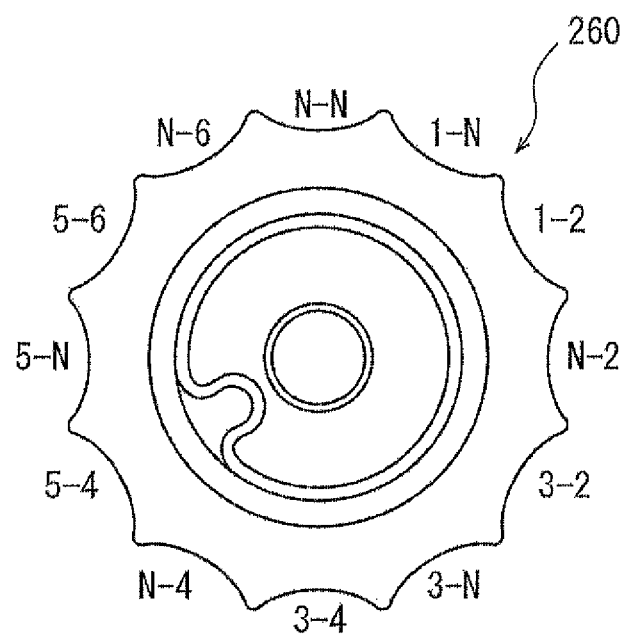
FIG. 5 is a plan view of a drum center.

FIG. 4 is a sectional view of a gear-change mechanism of the main transmission 61. In addition, FIG. 5 is a plan view of a drum center 260 configured to regulate a turn position of a shift drum 269. The shift drum 269 in the shape of a hollow cylinder is rotatably and axially supported by the crankcase 52. The shift drum 269 is placed in parallel with the axial direction of the power transmission device T. There are four shift forks for turning the shift drum 269 in total, i.e., two shift forks are provided on each of two fork shafts. In this drawing, only a first fork shaft 264 and two shift forks 261 and 263 are illustrated.

Lead grooves 265 to 268, which engage with columnar protrusions formed on lower end parts of the shift forks 261 and 263 (and two shift forks not illustrated), are formed in the outer circumferential surface of the shift drum 269. The shift forks 261 and 263 engage with the first fork shaft 264, disposed in parallel with the shift drum 269, so as to be slidable on this shaft in its axial direction. Thus, once the shift drum 269 is turned, other end parts (not illustrated) of the total of four shift forks change the meshing status of adjacent dogs of the gear trains G1 to G6.

As illustrated in FIG. 5, the setting on the turn position of the shift drum 269 is regulated by the drum center 260. In addition to "N-N" in which the transmission 60 becomes completely neutral mode, a "1-2" position for the first and second speeds, a "3-2" position for the second and third speeds, a "3-4" position for the third and fourth speeds, and a "5-4" position for the fourth and fifth speeds are set as predetermined turn positions. For example, when the shift drum 269 is located at the "1-2" position, a gear-change operation between the first and second speeds is possible only by changing the connection mode of each of a first clutch CL1 and a second clutch CL2.

In this embodiment, "1-N", "N-2", "3-N", "N-4", and "5-N" positions as neutral standby positions are respectively set between the predetermined turn positions of the shift drum 269. Since these neutral standby positions are set, after the gear is changed from the first speed to the second speed by way of clutch switching control at the predetermined turn position "1-2", for example, the gear position is shifted to the "N-2" position to set only the odd-numbered gears in neutral mode, whereby friction caused by co-rotation of the first hydraulic clutch 63 is prevented. Subsequently, in the same manner, to shift up the gear from the second speed to the third speed, for example, the gear position is pre-shifted from the "N-2" position to the "3-2" position and clutch switching control is carried out according to a shift-up command, and then the gear position is switched to the "3-N" position immediately after the gear-change to set the even-numbered gears in neutral mode.

The turn operation of the shift drum 269 is carried out by the gear-change electric motor 72, which is controlled to drive by a controller. Rotational drive force of the gear-change electric motor 72 is transmitted from an output shaft 251 to a shift spindle 270 via a mid gear 252 and a sector gear 253. A shift arm 273 is mounted on the shift spindle 270. The shift drum 269 is configured to be turned in one direction by a predetermined angle via a pole ratchet mechanism 257 when the shift arm 273 makes one forward-reverse rotation by a predetermined angle.

The drum center 260 immovably fixed on the shift drum 269 with a center bolt 259 serves to give a click-stop feel to the switching operation of the shift drum 269 among the predetermined turn positions and the neutral standby positions. The pole ratchet mechanism 257 is rotatably held by a guide plate 256 fixed on the crankcase 52 and a shifter assembly 258, and one end part of the shifter assembly 258 engages with an engagement hole formed in the shift arm 273. A return spring 254 configured to apply biasing force in the direction to return the shift arm 273 to its initial position engages in the space between the shift spindle 270 and a guide pin 255.

In the drawing, a shift position sensor 271 as a position detecting unit configured to detect a current gear stage based on the turn position of the shift drum 269 is provided on a right end part of the shift drum 269, and a turn angle sensor 272 is mounted on a right end part of the shift spindle 270.

Figure 6:
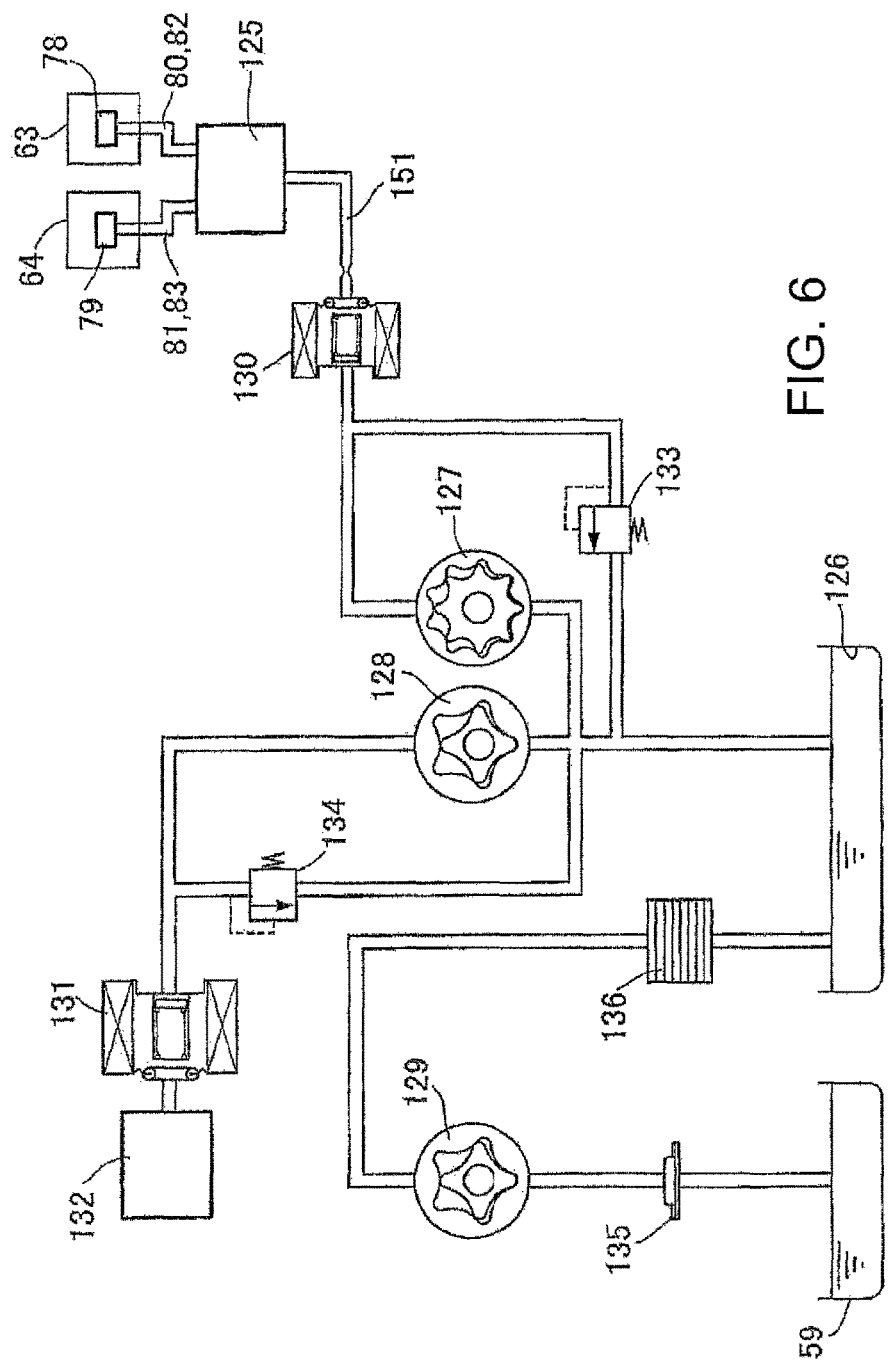
FIG. 6 is a schematic diagram of the entire oil flow path.

FIG. 6 is a schematic diagram of the entire oil flow path. The engagement/disengagement of the first and second hydraulic clutches 63 and 64 is switched by a clutch hydraulic pressure control circuit 125. The clutch hydraulic pressure control circuit 125 includes: a solenoid valve, which is driven by an electromagnet and configured to turn on/off hydraulic pressure supply; and a shift valve, which is configured to switch the destination to feed hydraulic pressure generated from an oil pump according to this on/off of hydraulic pressure supply, and these are arranged in the clutch cover 56 (see FIG. 1) in a centralized fashion.

An oil reservoir 126 configured to temporarily reserve oil is formed between the spacer plate 55 and the oil reservoir tank 57 (see FIGS. 1 and 2). Oil from a first oil feed pump (oil pump) 127 configured to suck up oil from the oil reservoir 126 is fed to the clutch hydraulic pressure control circuit 125 via a first oil filter 130.

The clutch hydraulic pressure control circuit 125 operates to switch: supply/shutoff of hydraulic pressure to the first oil path 82 and the first axial oil path 80 which communicate with the first hydraulic chamber 78 of the first hydraulic clutch 63; and supply/shutoff of hydraulic pressure to the second oil path 83 and the second axial oil path 81 which communicate with the second hydraulic chamber 79 of the second hydraulic clutch 64, which switches engagement/disengagement of the first and second hydraulic clutches 63 and 64. Surplus oil from the first oil feed pump 127 is returned back to the oil reservoir 126 via a first relief valve 133.

A second oil feed pump 128 for feeding oil to portions to be lubricated 132 is connected to the oil reservoir 126. Oil from the second oil feed pump 128 is fed to the multiple portions to be lubricated 132 of the power unit P via a second oil filter 131. Surplus oil from the second oil feed pump 128 is returned back to the oil reservoir 126 via a second relief valve 134.

Oil inside the oil pan 59 is sucked up by a scavenging pump 129 via a strainer 135, and the oil discharged from the scavenging pump 129 is fed to the oil reservoir 126 via an oil cooler 136.

Referring also to FIGS. 1 and 2, the first oil feed pump 127, the second oil feed pump 128, and the scavenging pump 129 are coaxially arranged in parallel with the axis of the crankshaft 39 so as to be driven by rotational power transmitted from the crankshaft 39, and they are placed in the spacer plate 55 and constitute a pump unit 138 in cooperation with one another.

The oil reservoir tank 57 has a recess portion 140 housing a part of the clutch cover 56 and is disposed adjacent to the clutch cover 56. The first and second oil filters 130 and 131 are arranged side by side in the vertical direction on an outer wall portion 57a of the oil reservoir tank 57 located on the side opposite the transmission 60, i.e., opposite the clutch cover 56 with respect to the crankshaft 39. The oil cooler 136 is mounted on an outer surface of an upper part of the oil reservoir tank 57 facing toward the rear of the vehicle.

Figure 7:
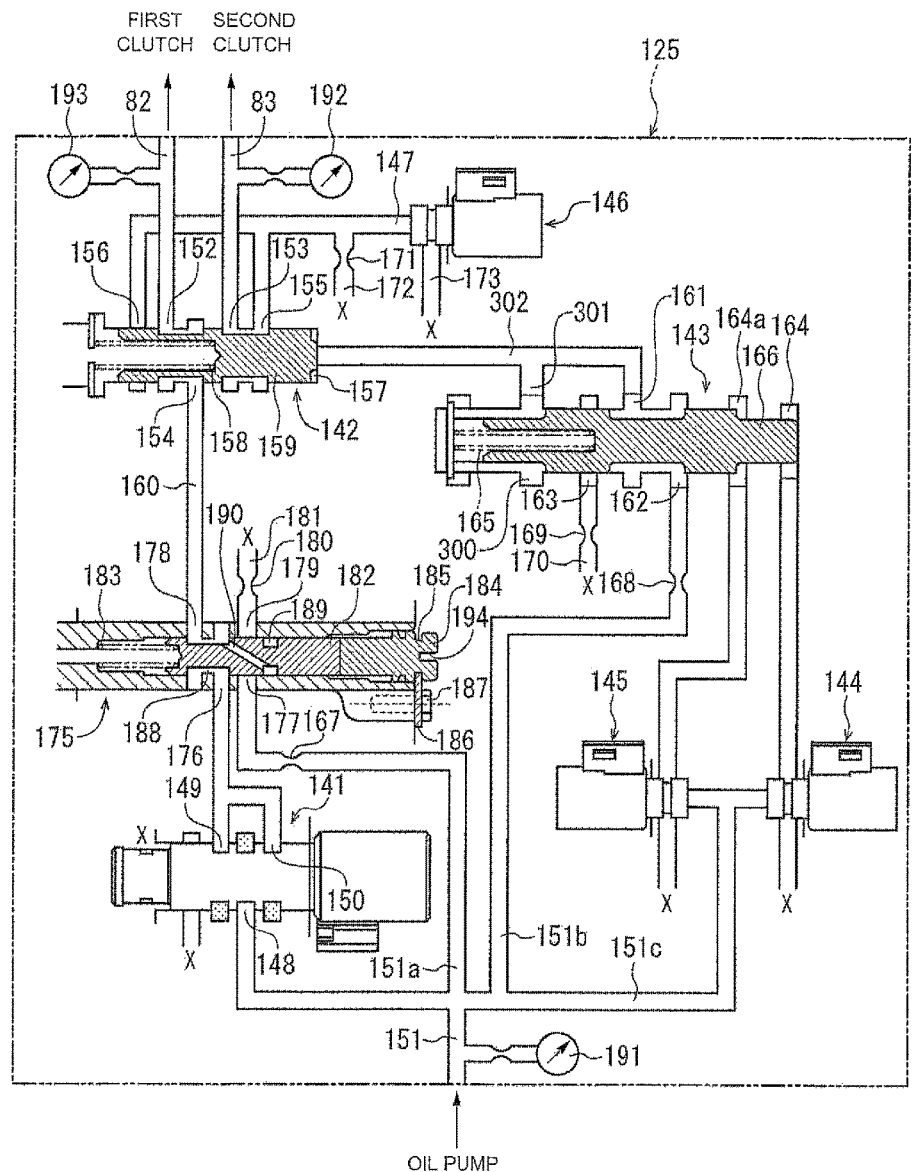
FIG. 7 is an explanatory diagram illustrating the details of a clutch hydraulic pressure control circuit.

FIG. 7 is an explanatory diagram illustrating the details of the clutch hydraulic pressure control circuit 125. The clutch hydraulic pressure control circuit 125 includes: a linear solenoid valve 141, which is a valve for the hydraulic control; a shift valve 142 for alternatively switching the destination chamber of oil from the linear solenoid valve 141 between the first and second hydraulic chambers 78 and 79 of the first and second hydraulic clutches 63 and 64 and feeding the oil to the destination chamber; a holding valve 143 for actuating the switching operation of the shift valve 142; a pair of shift solenoid valves 144 and 145 configured to control the actuation of the switching operation by the holding valve 143. The clutch hydraulic pressure control circuit further includes a discharge control solenoid valve 146 configured to open/close a discharge oil path 147, which is connected to its destination chamber selected by the alternative switching between the first and second hydraulic chambers 78 and 79 (see FIG. 3) of the first and second hydraulic clutches 63 and 64.

The shift valve 142 includes: a first output port 152, which is connected to the first oil path 82 communicating with the first hydraulic chamber 78 of the first hydraulic clutch 63; a second output port 153, which is connected to the second oil path 83 communicating with the second hydraulic chamber 79 of the second hydraulic clutch 64; an input port 154, which communicates with a connection oil path 160; a pair of discharge ports 155 and 156 both of which communicate with the discharge oil path 147; and a spool valve 159, which is disposed so that its one end faces a pilot chamber 157 and spring force of a return spring 158 acts on the other end.

To the connection oil path 160, oil with its pressure adjusted by the linear solenoid valve 141, or oil from a first branch oil feed path 151a which has an orifice 167, branches from an oil feed path 151, and bypasses the linear solenoid valve 141 is led.

The holding valve 143 includes: an output port 161, which is connected to the pilot chamber 157 of the shift valve 142; an input port 162, which is connected to a second branch oil feed path 151b having an orifice 168 and branching from the oil feed path 151; a release port 163; a spool valve 166, which is disposed so that its one end faces a first pilot chamber 164 and a second pilot chamber 164a and spring force of a return spring 165 acts on the other end; and a communicating port 301, which communicates the output port 161 and a left space of the spool valve 166 with each other. A release oil path 170 having an orifice 169 is connected to the release port 163. The output port 161 and the shift valve 142 are connected to each other by an oil feed path 302.

The first pilot chamber 164 serves as a first pressure sensing section, and the second pilot chamber 164a serves as a second pressure sensing section. In addition, a part communicating with the communicating port 301 serves as a third pressure sensing section 300 located on the downstream side of the branch paths 151b and 151c.

The paired shift solenoid valves 144 and 145 are connected in parallel to the third branch oil feed path 151c branching from the oil feed path 151 so that they switch the mode between: a mode of allowing the oil feed path 151 to communicate with the pilot chambers 164; and a mode releasing oil from the pilot chambers 164 to the outside. The discharge control solenoid valve 146 is capable of switching the mode between: a mode of releasing hydraulic oil from the discharge oil path 147 to the outside via a release oil path 172 having an orifice 171; and a mode of guiding hydraulic oil from the discharge oil path 147 to release the oil to the outside without contracting it.

According to the clutch hydraulic pressure control circuit 125 described above, it is possible to drive the shift valve 142 and switch the clutch to be supplied with hydraulic pressure by driving the first and second shift solenoid valves 144 and 145 at the same time.

Specifically, in a state where the first and second shift solenoid valves 144 and 145 are set to open mode and the oil feed path 151c is allowed to communicate with the first and second pilot chambers 164 and 164a of the holding valve 143, the spool valve 166 of the holding valve 143 is set at such a position that it shuts off the input port 162 communicating with the second branch oil feed path 151b and connects the release port 163 to the output port 161. In response to the operation of the holding valve 143, the spool valve 159 of the shift valve 142 is set at such a position that it allows the first output port 152 to communicate with the connection oil path 160 and shuts off this port from the first discharge port 156, and allows the second output port 153 to communicate with the second discharge port 155 and shuts off this port from the connection oil path 160.

When oil from the pilot chambers 164 of the holding valve 143 is released to the outside by the first and second shift solenoid valves 144 and 145, the spool valve 166 of the holding valve 143 is set at such a position that it connects the input port 162 communicating with the second branch oil feed path 151b to the output port 161 and shuts off the release port 163 from the output port 161. In response to the operation of the holding valve 143, the spool valve 159 of the shift valve 142 is set at such a position that it allows the second output port 153 to communicate with the connection oil path 160 and shuts off this port from the second discharge port 156, and allows the first output port 152 to communicate with the first discharge port 155 and shuts off this port from the connection oil path 160.

In the space between the linear solenoid valve 141 and the connection oil path 160 communicating with the input port 154 of the shift valve 142, a manual switchover valve 175 is provided and is capable of guiding oil from the first oil feed pump 127 toward the shift valve 142 via the first branch oil feed path 151a bypassing the linear solenoid valve 141. By manipulating the manual switchover valve 175, this valve can guide hydraulic pressure fed from the oil pump directly to the shift valve 142 even in case of the failure of the liner solenoid valve 141.

The manual switchover valve 175 includes: a first input port 176, which communicates with an output port 149 of the linear solenoid valve 141; a second input port 177, which communicates with the first branch oil feed path 151a; an output port 178, which communicates with the connection oil path 160; a release port 179, which is connected to a release oil path 181 having an orifice 180; a spool valve 182, which is capable of moving between a position where the first input port 176 is allowed to communicate with the output port 178 and a position where the second input port 177 is allowed to communicate with the output port 178; a spring 183, which biases the spool valve 182 toward the position where the first input port 176 is allowed to communicate with the output port 178; and a control piston 184, which is in contact with the spool valve 182 from the side opposite the spring 183 so as to be capable of pushing and moving the spool valve 182 against the biasing force of the spring 183 toward the position where the second input port 177 is allowed to communicate with the output port 178.

The control piston 184 is screwed in the clutch cover 56 so as to be capable of advancing and retreating relative to the clutch cover, and an annular locking recess portion 185 is formed in the outer circumference of an outer end portion of the control piston 184. An engagement plate 186 designed to be capable of engaging with the locking recess portion 185 is fastened to the clutch cover 56 with a screw member 187 and, in a state where the engagement plate 186 fastened to the clutch cover 56 engages with the locking recess portion 185, the spool valve 182 is located at its retreat position as illustrated in the drawing. Then, when the control piston 184 is advanced by screwing it in a state where the engagement plate 186 is released from being fastened to the clutch cover 56 and released from engaging with the locking recess portion 185, the spool valve 182 is moved to its advance position. The spool valve 182 is held in the advance position by engaging the engagement plate 186 fastened to the clutch cover 56 with the outer end of the control piston 184.

In the outer circumference of the spool valve 182, an annular recess portion 188 is formed that communicates with the output port 178 and is shut off from communication with the second input port 177 irrespective of the position of the spool valve 182. The annular recess portion 188 is formed so that it allows the input port 177 to communicate with the release port 179 when the spool valve 182 is at the retreat position but shuts off this port from the first input port 176 when the spool valve 182 is at the advance position. In addition, an annular groove 189 is formed that communicates with the second input port 177 and the release portion 179 when the spool valve 182 is at the advance position but is shut off from the second input port 177 and the release port 179 when the spool valve 182 is at the retreat position. The spool valve 182 also has an orifice path 190, which connects the annular recess portion 188 and the annular groove 189 to each other.

The oil feed path 151 is provided with a first hydraulic sensor 191, which is configured to detect the supply pressure of oil fed from the first oil feed pump 127 via the first oil filter 130, the first oil path 82 is provided with a second hydraulic sensor 192, which is configured to detect hydraulic pressure to act on the first hydraulic clutch 63, and the second oil path 83 is provided with a third hydraulic sensor 193, which is configured to detect hydraulic pressure to act on the second hydraulic clutch 64.

Figure 8:
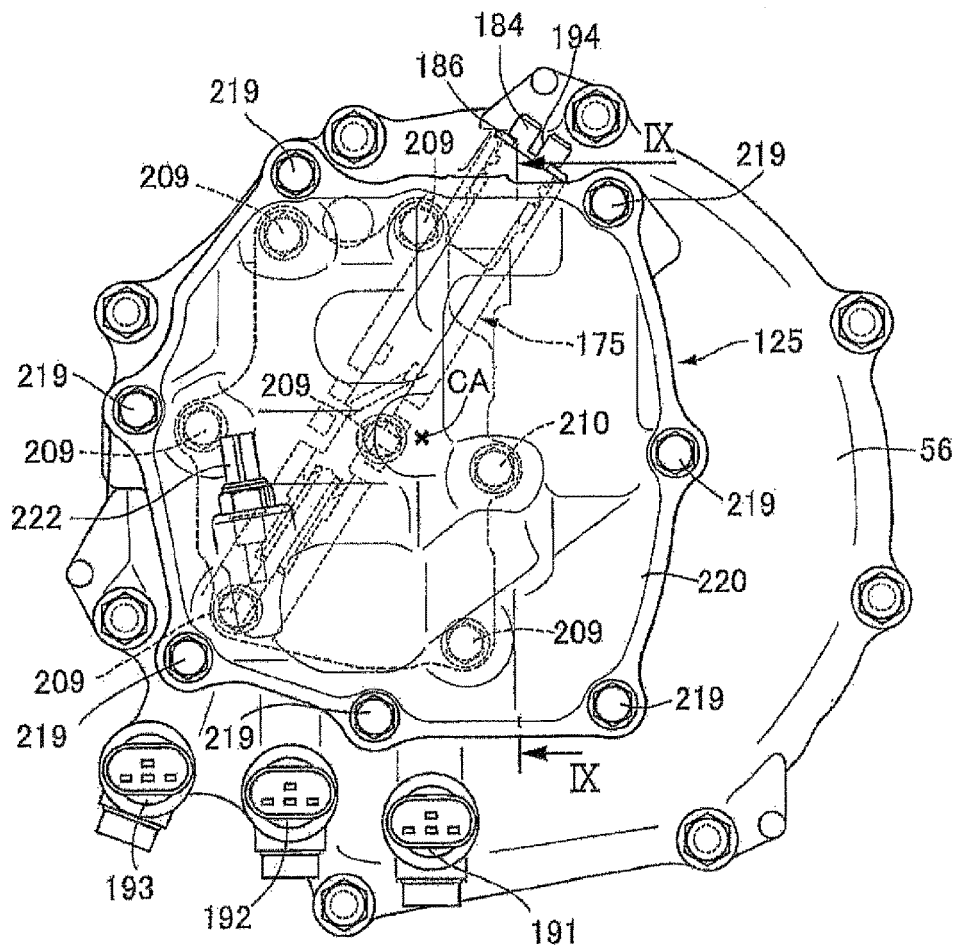
FIG. 8 is a front view of a clutch cover.
Figure 9:
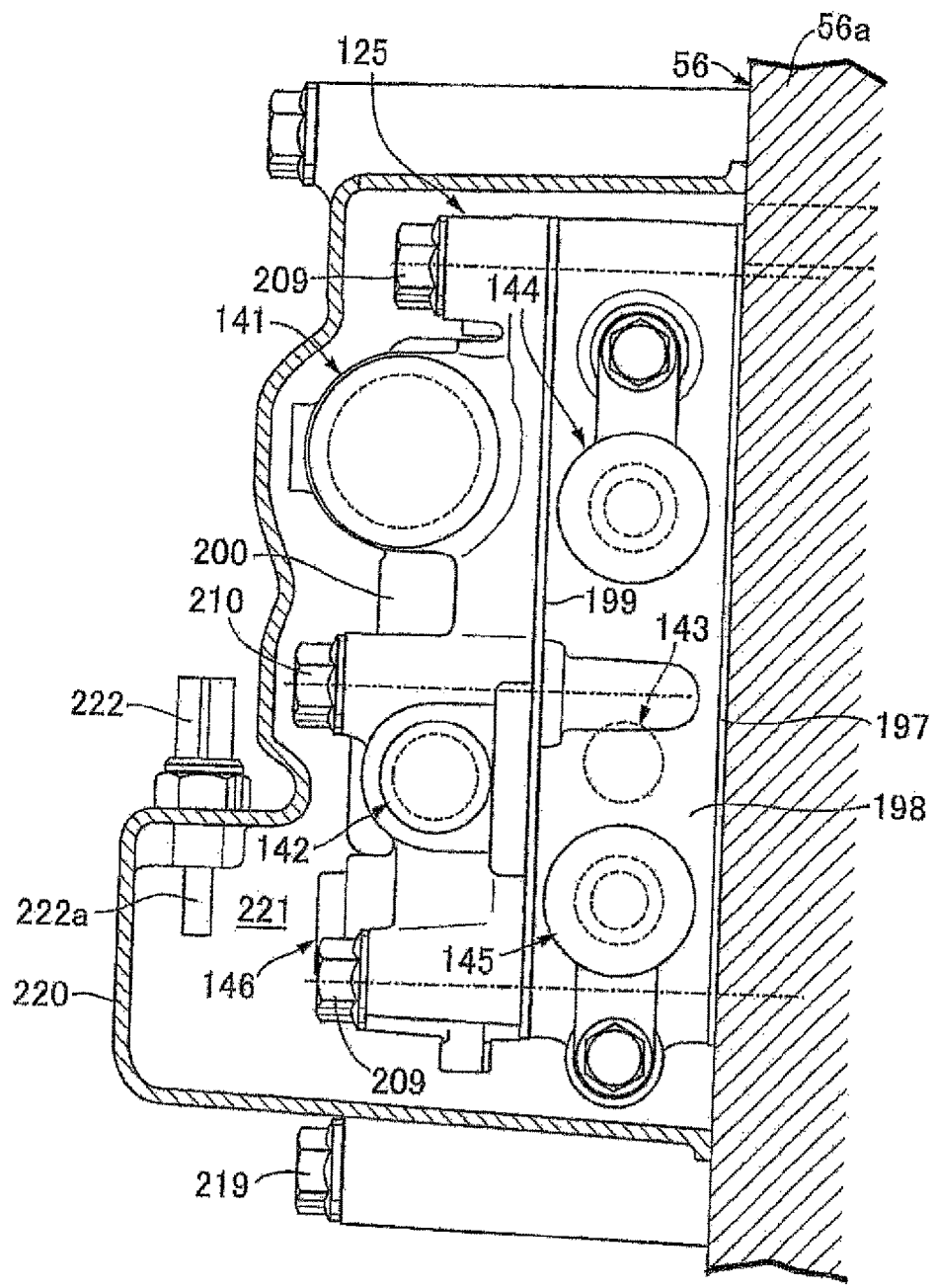
FIG. 9 is a sectional view taken along a line IX-IX in FIG. 8.

FIG. 8 is a front view of the clutch cover 56. In addition, FIG. 9 is a sectional view taken along a line IX-IX in FIG. 8. Referring also to FIGS. 1 and 2, a mounting portion 56a on which to mount the clutch hydraulic pressure control circuit 125 protrudes integrally on an outer surface of the clutch cover 56, and the manual switchover valve 175 is mounted on the mounting portion 56a so as to extend in the vertical direction while tilting from bottom left to top right in FIG. 8.

The control piston 184, which enables manual operation in case of failure of the clutch hydraulic pressure control circuit 125, is screwed in the mounting portion 56a so as to be capable of advancing and retreating relative to the mounting portion and so that its outer end part faces the outside on the right side of the mounting portion 56a. A tool locking recess portion 194 with which a tool engages to enable rotation operation of the control piston 184 is formed in the outer end of the control piston 184.

In addition to the linear solenoid valve 141, the shift valve 142, the holding valve 143, the shift solenoid valves 144 and 145, and the discharge control solenoid valve 146, the clutch hydraulic pressure control circuit 125 includes a first partition plate 197, a first actuator body 198, a second partition plate 199, and a second actuator body 200 in order to support the valves 141 to 146 and constitute oil paths between them.

The first actuator body 198 is mounted on the mounting portion 56*a* with the first partition plate 197 interposed therebetween, and the second actuator body 200 overlapping the first actuator body 198 from the side opposite the clutch cover 56 is mounted on the first actuator body 198 with the second partition plate 199 interposed therebetween.

The mounting portion 56*a* is provided on the outer surface of the clutch cover 56 so as to overlap the first and second hydraulic clutches 63 and 64 at least partially as seen in a direction along the axis CA of the first and second main shafts 69 and 70 of the transmission 60. In this embodiment, the mounting portion is disposed at a position leaning to the left side in the vehicle widthwise direction with respect to the axis CA of the first and second main shafts 69 and 70.

The first partition plate 197 and the first actuator body 198 are mounted on the mounting portion 56*a* at a position leaning to the left side in the vehicle widthwise direction further than the mounting portion 56*a* with respect to the axis CA of the first and second main shafts 69 and 70.

The first partition plate 197, the second partition plate 199, and the second actuator body 200 are mounted on the first actuator body 198 by fastening a bolt 209 to the mounting portion 56*a* of the clutch cover 56 and fastening a bolt 210 into the first actuator body 198.

The holding valve 143 and the shift solenoid valves 144 and 145 are arranged side by side in the vertical direction so that their operating axes extend horizontally along a plane intersecting the axis CA of the first and second main shafts 69 and 70 at a right angle. The first actuator body 198 has valve mounting holes (not illustrated) which extend horizontally along the plane intersecting the axis of the first and second hydraulic clutches 63 and 64, i.e., the axis CA of the first and second main shafts 69 and 70 at a right angle and which open in a right side surface of the first actuator body 198, and the holding valve 143 and the shift solenoid valves 144 and 145 are mounted in the respective valve mounting holes.

Meanwhile, the linear solenoid valve 141, the shift valve 142, and the discharge control solenoid valve 146 are arranged in the second actuator body 200. The second actuator body 200 has valve mounting holes (not illustrated), which extend horizontally along the plane intersecting the axis CA of the first and second main shafts 69 and 70 at a right angle and which open in both left and right side surfaces of the second actuator body 200, and the linear solenoid valve 141, the shift valve 142, and the discharge control solenoid valve 146 are mounted in the respective valve mounting holes.

The second actuator body 200 has in its lower part a mounting hole, which extends parallel with the axis CA of the first and second main shafts 69 and 70 and opens on the side opposite the clutch cover 56, and the discharge control solenoid valve 146 is mounted in this mounting hole.

The oil paths connecting the linear solenoid valve 141, the shift valve 142, the holding valve 143, the shift solenoid valves 144 and 145, and the discharge control solenoid valve 146 to one another are partially constituted by multiple grooves, through holes, and closed-end holes provided in the first and second actuator bodies 198 and 200 and through holes provided in the first and second partition plates 197 and 199.

Multiple screw holes spaced from one another are arranged in an outer circumferential part of the mounting portion 56*a* of the clutch cover 56. An actuator cover 220, which covers the clutch hydraulic pressure control circuit 125 in a watertight manner with the mounting portion 56*a*, is mounted on the mounting portion with multiple bolts 219 screwed in these screw holes, and an oil chamber 221 is defined in the space between the mounting portion 56*a* of the clutch cover 56 and the actuator cover 220.

The second and third hydraulic sensors 192 and 193 configured to respectively detect hydraulic pressures to act on the first and second hydraulic clutches 63 and 64 are mounted on an outer surface of a lower part of the clutch cover 56 at a position below the first and second actuator bodies 198 and 200, and below the actuator cover 220 covering the first and second actuator bodies 198 and 200 in the case of this embodiment, so that they are arranged side by side in the vehicle widthwise direction. In addition, the first hydraulic sensor 191 configured to detect the supply pressure of oil fed from the first oil feed pump 127 is mounted on the outer surface of the lower part of the clutch cover 56 at a position sandwiching the second hydraulic sensor 192 between itself and the third hydraulic sensor 193.

The temperature of oil reserved in the oil chamber 221 is detected by an oil temperature sensor 222. The oil temperature sensor 222 is mounted on a left lower part of the actuator cover 220 so that its detector 222*a* is disposed in a lower part of the oil chamber 221 in such a way as to overlap a left lower part of the second actuator body 200 as seen in the direction along the axis CA of the first and second main shafts 69 and 70.

Hereinbelow, the behavior of the clutch hydraulic pressure control circuit 125 according to this embodiment is described with reference to FIGS. 10 to 13. As described previously, the clutch hydraulic pressure control circuit 125 is particularly characterized by including the two shift solenoid valves and adding a twist in the configuration of the holding valve 143 to implement such a configuration that no hydraulic pressures to be fed to the hydraulic clutches 63 and 64 vary even when either one of the first and second shift solenoid valves 144 and 145 fails during driving in any of the "1-N", "N-2", "3-N", "N-4", and "5-N" gear positions as the neutral standby positions selected by the transmission 60.

Figure 10:
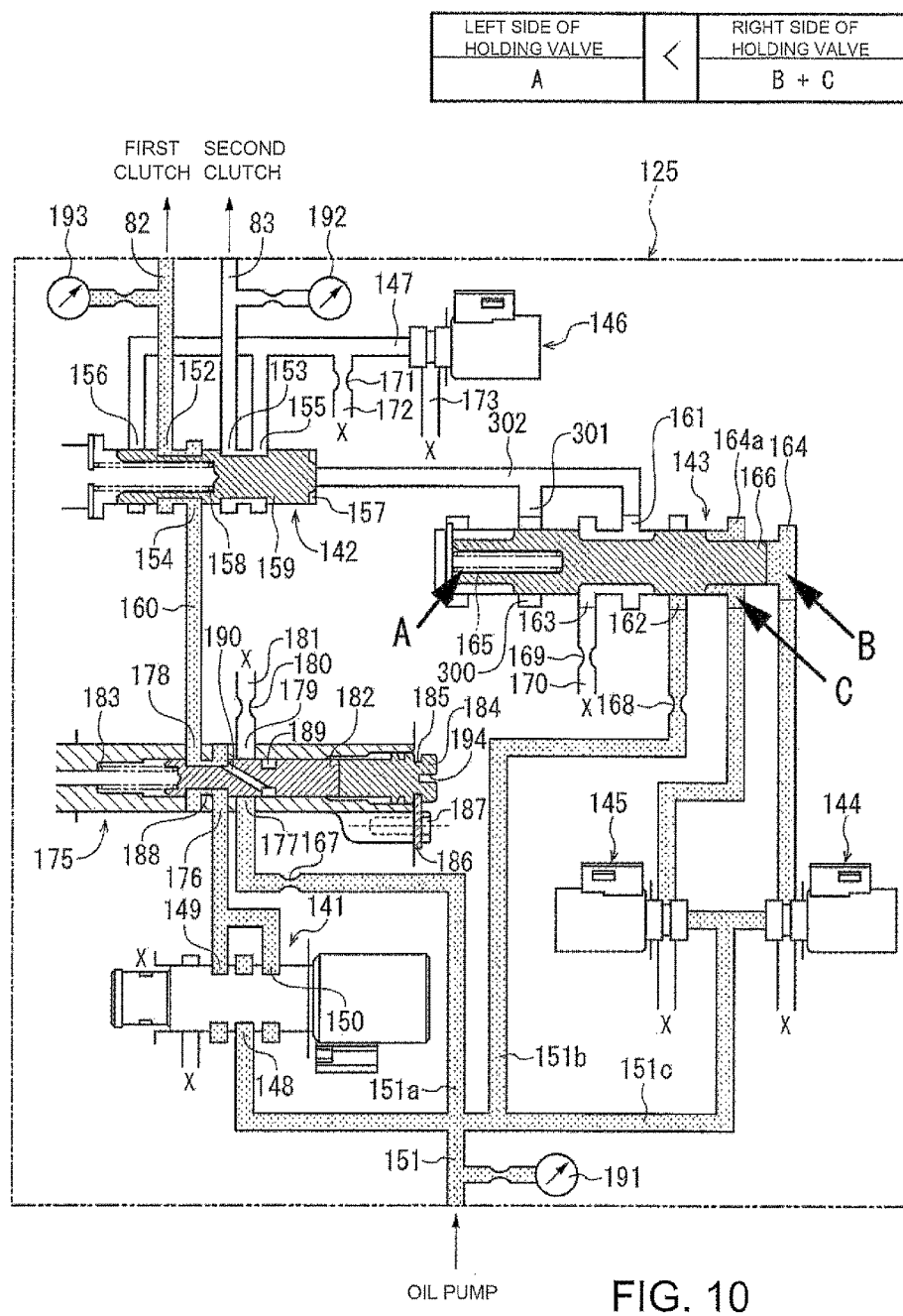
FIG. 10 is an explanatory diagram illustrating the behavior of a clutch hydraulic pressure control circuit (during driving in any of odd-numbered gears).

FIG. 10 is an explanatory diagram illustrating the behavior of the clutch hydraulic pressure control circuit 125 during driving in any of the odd-numbered gears. In the shift valve 142, the spool valve 159 is located on the right side in the drawing by the biasing force of the return spring 158 unless hydraulic pressure is fed from the outside via the holding valve 143. At this time, hydraulic pressure fed through the connection oil path 160 is fed to the first hydraulic clutch 63. In addition, although in this embodiment the first and second shift solenoid valves 144 and 145 are of normally open type in which they open the hydraulic pressure paths while not energized and shut off the hydraulic pressure paths while energized, their behaviors according to the invention of the present application can also be achieved even if they are of normally closed type.

With the above configuration, during driving in any of the odd-numbered gears, hydraulic pressure is fed to the first pilot chamber 164 and the second pilot chamber 164*a* of the holding valve 143 by not energizing the first and second shift solenoid valves 144 and 145. Thus, the spool valve 166 moves to the left in the drawing against the biasing force of the return spring 165, whereby hydraulic pressure fed through the second branch oil feed path 151*b* is shut off by the holding valve 143.

In this state, since hydraulic pressure supply to the shift valve 142 is shut off, the spool valve 159 of the shift valve 142 is kept biased in the right direction in the drawing, whereby hydraulic pressure is fed to the first hydraulic clutch 63.

At this time, the following relation is satisfied:

B=C, A<B, where A indicates the biasing force of the return spring 165, B indicates the hydraulic pressure of the first pilot chamber 164, and C indicates the hydraulic pressure of the second pilot chamber 164a.

Accordingly, the magnitude correlation between the left pressure and right pressure of the holding valve 143 in FIG. 10 becomes A<B+C, and thus the spool valve 166 is located on the left side in the drawing.

Figure 11:
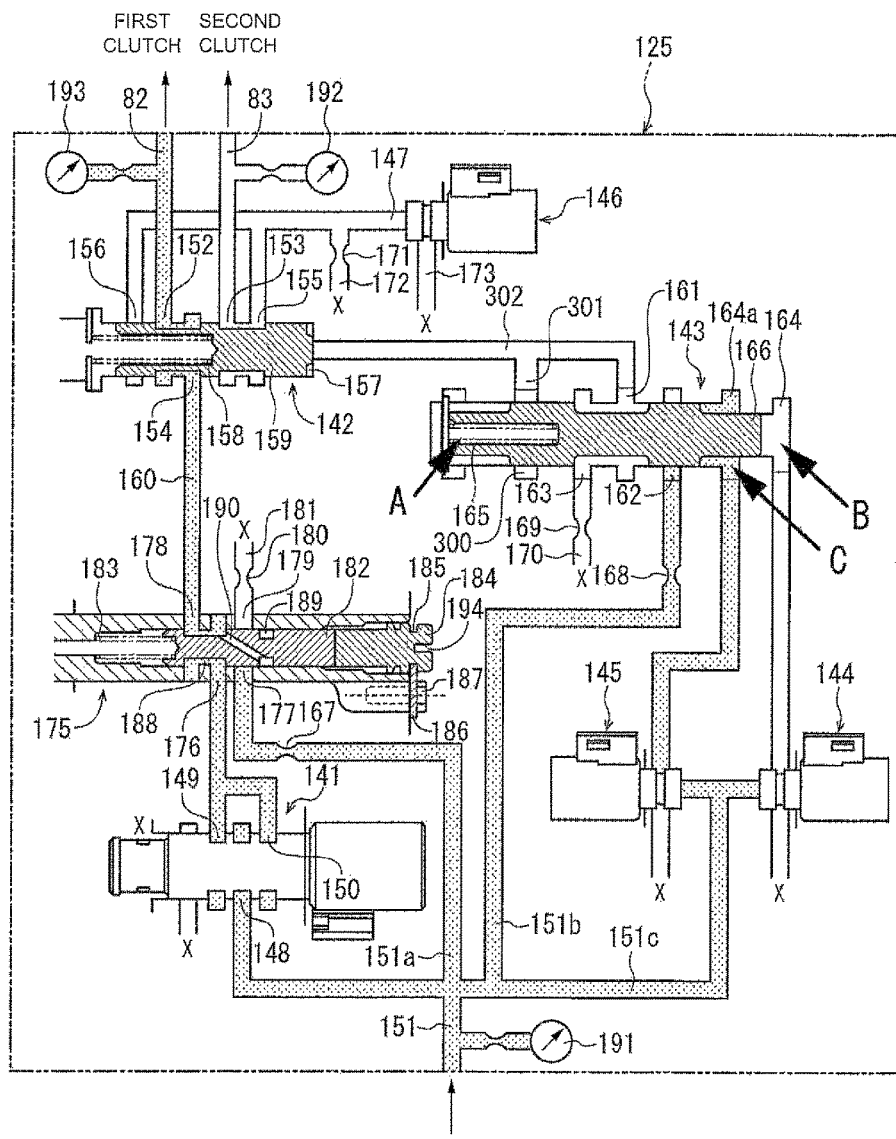
FIG. 11 is an explanatory diagram illustrating the behavior of the clutch hydraulic pressure control circuit (a first shift solenoid valve fails during driving in any of the odd-numbered gears).

FIG. 11 is an explanatory diagram illustrating the behavior of the clutch hydraulic pressure control circuit 125 in case of the failure of the first shift solenoid valve 144 during driving in any of the odd-numbered gears. In the clutch hydraulic pressure control circuit 125 according to this embodiment, the position of the spool valve 166 is not changed even when the first shift solenoid valve 144 (or the second shift solenoid valve 145) fails during driving in the odd-numbered gear and the valve to feed hydraulic pressure to the holding valve 143 becomes only the second shift solenoid valve 145. This is because, even when the first shift solenoid valve 144 fails and B becomes equal to 0, the correlation between the left pressure and right pressure of the holding valve 143 only changes to A<0+C and thus the magnitude correlation does not change from that in the normal state.

In an existing configuration including a single shift solenoid valve, if the normally-open shift solenoid valve happens to close in spite of being not energized due to some sort of failure, hydraulic pressure might not be fed to the first hydraulic clutch 63. On the other hand, in this embodiment, since there are two shift solenoid valves 144 and 145 and the spring constant of the return spring 165 is set at a proper value, hydraulic pressure to be fed to the first hydraulic clutch 63 no longer varies during driving even when one of the shift solenoid valves fails and closes. Note that, in case of failure of one of the shift solenoid valves 144 and 145, it is possible to notify a rider by way of an indicator or the like to prompt him/her to make inspection and repair.

Figure 12:
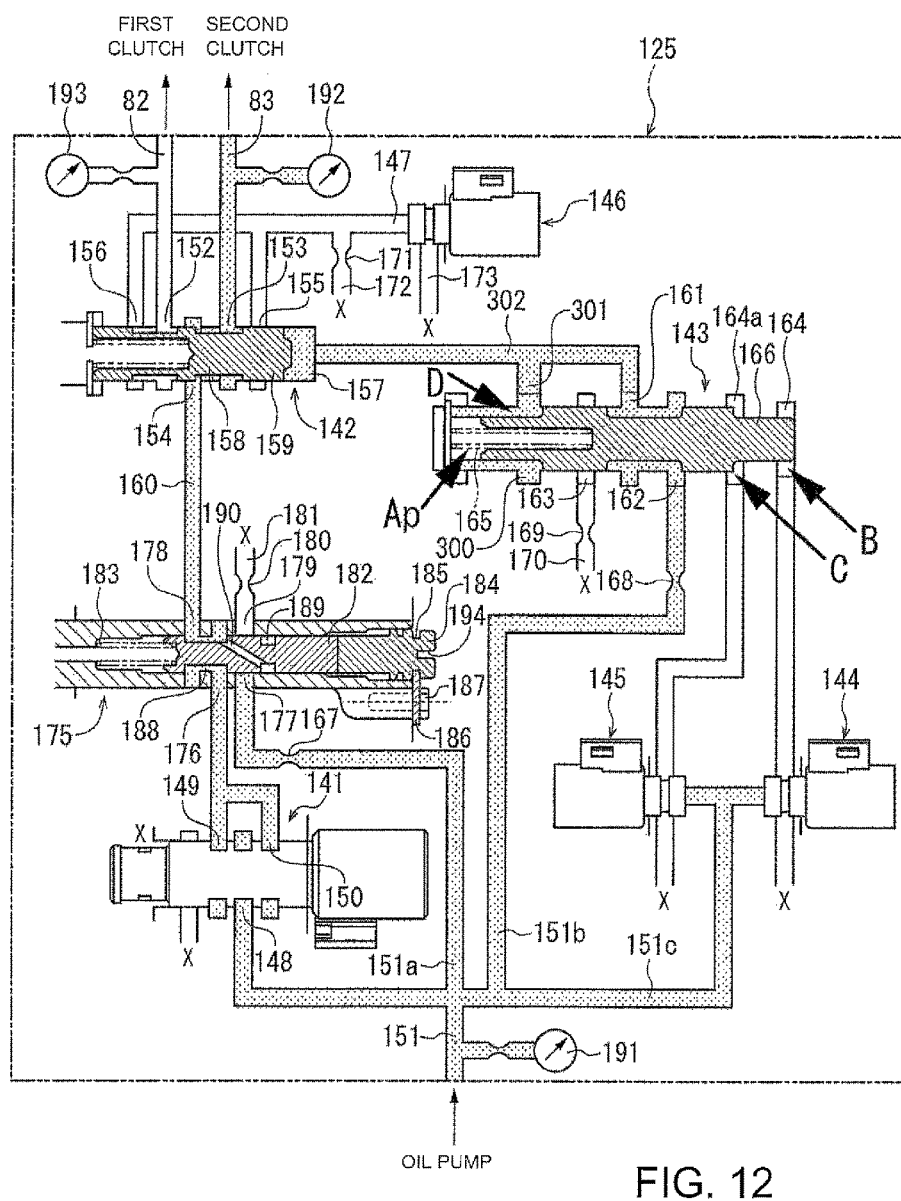
FIG. 12 is an explanatory diagram illustrating the behavior of the clutch hydraulic pressure control circuit (during driving in any of even-numbered gears).

FIG. 12 is an explanatory diagram illustrating the behavior of the clutch hydraulic pressure control circuit 125 during driving in any of the even-numbered gears. The shift valve 142 moves the spool valve 159 to the left side in the drawing against the biasing force of the return spring 158 upon supply of hydraulic pressure from the outside via the holding valve 143. Thereby, hydraulic pressure fed through the connection oil path 160 is fed to the second hydraulic clutch 64.

During driving in any of the even-numbered gears, the first and second shift solenoid valves 144 and 145 are both energized and thereby shut off hydraulic pressure to the first pilot chamber 164 and the second pilot chamber 164a of the holding valve 143. Thus, the spool valve 166 moves to the right in the drawing by the biasing force of the return spring 165, hydraulic pressure fed through the second branch oil feed path 151b is fed to the shift valve 142 via the holding valve 143, the spool valve 159 of the shift valve 142 moves to the left in the drawing against the biasing force of the return spring 165, whereby hydraulic pressure is fed to the second hydraulic clutch 64.

At this time, the following relation is satisfied:

Ap<A, B=0, C=0, where Ap indicates the biasing force of the return spring 165, B indicates the hydraulic pressure of the first pilot chamber 164, C indicates the hydraulic pressure of the second pilot chamber 164a, and D indicates the hydraulic pressure of the communicating port 301 communicating with the left side of the spool valve 166. Note that the biasing force Ap<the biasing force A is satisfied because the preload of the return spring 165 is reduced (its initial length is increased) by the movement of the spool valve 166 to the right.

Accordingly, the magnitude correlation between the left pressure and right pressure of the holding valve 143 becomes Ap+D>0+0, and thus the spool valve 166 is located on the right side in the drawing.

Figure 13:
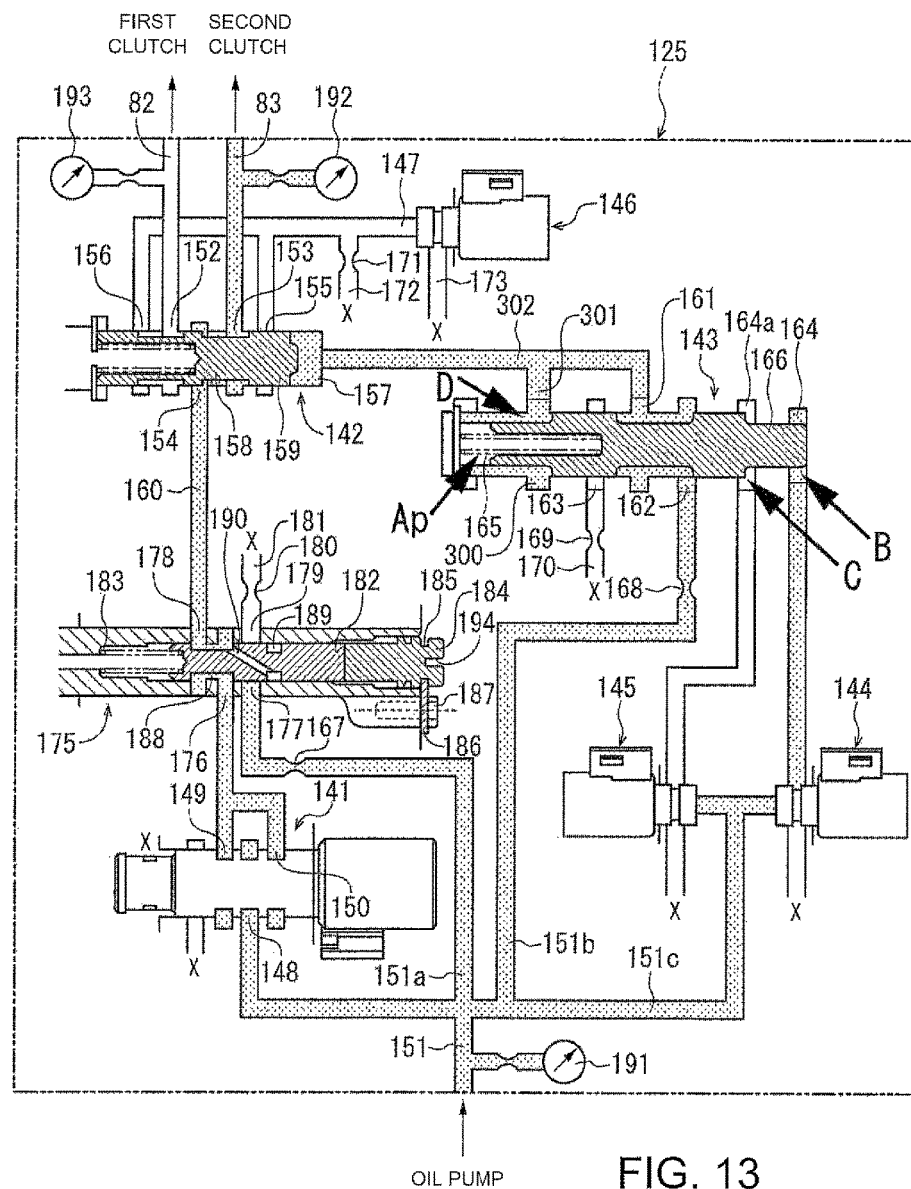
FIG. 13 is an explanatory diagram illustrating the behavior of the clutch hydraulic pressure control circuit (the first shift solenoid valve fails during driving in any of the even-numbered gears).

FIG. 13 is an explanatory diagram illustrating the behavior of the clutch hydraulic pressure control circuit 125 in case of the failure of the first shift solenoid valve 144 during driving in any of the even-numbered gears. In the clutch hydraulic pressure control circuit 125 according to this embodiment, the position of the spool valve 166 is not changed even when the first shift solenoid valve 144 (or the second shift solenoid valve 145) fails during driving in the even-numbered gear and hydraulic pressure supply to the holding valve 143, which is originally supposed to be zero, happens to be executed by the first shift solenoid valve 144 (or the second shift solenoid valve 145). This is because, even when the first shift solenoid valve 144 fails and hydraulic pressure B occurs, the correlation between the left pressure and right pressure of the holding valve 143 only changes to Ap+D>B+0 and thus the magnitude correlation does not change from that in the normal state.

In an existing configuration including a single shift solenoid valve, if the shift solenoid valve happens to open in spite of being energized due to some sort of failure, hydraulic pressure might not be fed to the second hydraulic clutch 64. On the other hand, in this embodiment, since there are two shift solenoid valves 144 and 145, the spring constant of the return spring 165 is set at a proper value, and the setting is made so that hydraulic pressure fed to the shift valve 142 is also applied on the left side of the spool valve 166 to generate hydraulic pressure D, hydraulic pressure to be fed to the second hydraulic clutch 64 no longer varies during driving even when one of the shift solenoid valves fails and opens.

As described above, according to the clutch hydraulic pressure control circuit 125 of this embodiment, hydraulic pressure to be fed to the first hydraulic clutch 63 or the second hydraulic clutch 64 does not vary even when one of the two shift solenoid valves 144, 145 fails during driving with the transmission 60 set in any of the neutral standby positions, whereby variation of drive force can be prevented.

Specifically, the clutch hydraulic pressure control circuit of this embodiment is characterized by including the holding valve 143 for keeping hydraulic pressure fed to the shift valve 142 even when hydraulic pressure supply through one of the first and second shift solenoid valves 144 and 145 happens to be shut off in a state where hydraulic pressure is fed through the first and second shift solenoid valves 144 and 145 to paths between the shift valve 142 and these shift solenoid valves, or when hydraulic pressure supply through one of the first and second shift solenoid valves 144 and 145 happens to occur in a state where no hydraulic pressure is fed through these shift solenoid valves. Thus, by driving the first and second shift solenoid valves synchronously, even when one of the shift solenoid valves fails with the first hydraulic clutch or the second hydraulic clutch being connected, the first hydraulic clutch or the second hydraulic clutch can be kept connected. Accordingly, a twin-clutch transmission employing a shift pattern of "neutral standby positions" can enjoy the friction reduction effect brought by the "neutral standby positions" while drive force no longer varies even when one of the shift solenoid valves fails during driving.

Note that the structure and configuration of the twin clutch, the shape and structure of each of the shift valve, the holding valve, and the shift solenoid valves, and the like are not limited to the above embodiment and may be modified in various ways. Although the shift solenoid valves in the above embodiment are of normally open type, they may be of normally closed type instead.

DESCRIPTION OF REFERENCE SYMBOLS

63 FIRST HYDRAULIC CLUTCH
64 SECOND HYDRAULIC CLUTCH
125 CLUTCH HYDRAULIC PRESSURE CONTROL CIRCUIT
127 FIRST OIL FEED PUMP (OIL PUMP)
141 LINEAR SOLENOID VALVE
142 SHIFT VALVE
143 HOLDING VALVE
144, 145 FIRST AND SECOND SHIFT SOLENOID VALVES
164 FIRST PRESSURE SENSING SECTION (FIRST PILOT CHAMBER)
164a SECOND PRESSURE SENSING SECTION (SECOND PILOT CHAMBER)
300 THIRD PRESSURE SENSING SECTION
166 SPOOL VALVE
P POWER UNIT
E INTERNAL COMBUSTION ENGINE
G1, G3, G5 ODD-NUMBERED GEAR
G2, G4, G6 EVEN-NUMBERED GEAR

What is claimed is:

1. A clutch hydraulic pressure control circuit of a twin-clutch transmission having a twin clutch composed of: a first hydraulic clutch corresponding to an odd-numbered gear of a transmission; and a second hydraulic clutch corresponding to an even-numbered gear of said transmission, and employing a shift pattern where one of said odd-numbered gear and said even-numbered gear is set in neutral mode when the other of said odd-numbered gear and said even-numbered gear is in drive force transmission mode, said circuit comprising:
    a shift valve that is configured to switch a destination to feed hydraulic pressure to either said first hydraulic clutch or said second hydraulic clutch;
    a holding valve configured to actuate switching operation of the shift valve;
    two shift solenoid valves that operate synchronously to actuate said shift valve, said two shift solenoid valves configured to control actuation of a switching operation of the holding valve; and
    said holding valve is configured to keep hydraulic pressure fed to said shift valve even when hydraulic pressure supply through one of said two shift solenoid valves is shut off in a state where hydraulic pressure is fed through said two shift solenoid valves to a path between said shift valve and said shift solenoid valves, or when hydraulic pressure supply through one of said two shift solenoid valves is in a state where no hydraulic pressure is fed through said shift solenoid valves.

2. The clutch hydraulic pressure control circuit according to claim 1, wherein said holding valve has:
    a first pressure sensing section and a second pressure sensing section to which hydraulic pressure fed through said two shift solenoid valves is fed;
    a spool valve that includes a return spring opposed to said first pressure sensing section and second pressure sensing section; and
    a third pressure sensing section that is provided in said holding valve so that hydraulic reaction force of supply hydraulic pressure to be fed through said holding valve to said shift valve is applied to a biasing force of said return spring.

3. The clutch hydraulic pressure control circuit according to claim 2, wherein
    said shift solenoid valves are normally-open valves that are open while not energized and closed while energized, and
    said third pressure sensing section is located downstream of a branch path designed to be opened and closed by said holding valve.

4. The clutch hydraulic pressure control circuit according to claim 3, wherein a linear solenoid valve configured to control hydraulic pressure to be fed to said first hydraulic clutch and said second hydraulic clutch is made as a normally-open valve that is open while not energized and closed while energized.

5. The clutch hydraulic pressure control circuit according to claim 2, wherein
    said shift solenoid valves are normally-closed valves that are closed while not energized and open while energized, and
    said third pressure sensing section is located downstream of a branch path designed to be opened and closed by said holding valve.

6. The clutch hydraulic pressure control circuit according to claim 5, wherein a linear solenoid valve configured to control hydraulic pressure to be fed to said first hydraulic clutch and said second hydraulic clutch is made as a normally-open valve that is open while not energized and closed while energized.

7. The clutch hydraulic pressure control circuit according to claim 2, wherein
    said two shift solenoid valves are formed of the same component, and
    said two shift solenoid valves perform control to open/close a branch path which branches from an oil feed path connected to an oil pump.

8. The clutch hydraulic pressure control circuit according to claim 2, wherein a linear solenoid valve configured to control hydraulic pressure to be fed to said first hydraulic clutch and said second hydraulic clutch is made as a normally-open valve that is open while not energized and closed while energized.

9. The clutch hydraulic pressure control circuit according to claim 1, wherein
    said two shift solenoid valves are formed of the same component, and
    said two shift solenoid valves perform control to open/close a branch path, which branches from an oil feed path connected to an oil pump.

10. The clutch hydraulic pressure control circuit according to claim 9, wherein a linear solenoid valve configured to control hydraulic pressure to be fed to said first hydraulic clutch and said second hydraulic clutch is made as a normally-open valve that is open while not energized and closed while energized.

11. The clutch hydraulic pressure control circuit according to claim 1, wherein a linear solenoid valve configured to control hydraulic pressure to be fed to said first hydraulic clutch and said second hydraulic clutch is made as a normally-open valve that is open while not energized and closed while energized.

\* \* \* \* \*